(12) United States Patent
Message et al.

(10) Patent No.: US 6,181,129 B1
(45) Date of Patent: Jan. 30, 2001

(54) DEVICE FOR DETECTING ROTATION OF A VEHICLE STEERING COLUMN

(75) Inventors: Olivier Message, Tours; Franck Landrieve, Fondettes; Jean-Luc Thoumieux, Saint Cyr sur Loire; Pascal Lhote, Fondettes, all of (FR)

(73) Assignee: SKF France, Clamart (FR)

( * ) Notice: Under 35 U.S.C. 154(b), the term of this patent shall be extended for 0 days.

(21) Appl. No.: 09/088,746

(22) Filed: Jun. 2, 1998

(30) Foreign Application Priority Data

Jul. 3, 1997 (FR) .................................................. 97 06809

(51) Int. Cl.[7] .................................. G01B 7/14; G01P 1/02
(52) U.S. Cl. .................................. 324/207.22; 324/207.25
(58) Field of Search ........................ 324/207.22, 207.25, 324/173, 174; 384/448; 74/492, 495

(56) References Cited

U.S. PATENT DOCUMENTS

| 5,158,374 | 10/1992 | Peilloud et al. . |
| 5,694,042 | * 12/1997 | Eaton et al. ..................... 324/207.22 |
| 5,942,890 | * 8/1999 | Reicks et al. ..................... 324/207.22 |

FOREIGN PATENT DOCUMENTS

| 0424185A1 | 4/1991 | (EP) . |
| 0443940A2 | 8/1991 | (EP) . |

* cited by examiner

*Primary Examiner*—Walter E. Snow
(74) *Attorney, Agent, or Firm*—Smith Gambrell & Russell, LLP

(57) ABSTRACT

Device for detecting parameters of the rotation of a shaft 1 that rotates with respect to a stationary element, there being at least one bearing between the shaft and the stationary element so that the shaft can be mounted to rotate with respect to the stationary element, the said device comprising an encoder means 15 rotated by the rotating shaft, and a sensor means 10 secured to a stationary element and arranged facing and a small air gap away from the encoder means whose passage during rotation is detected by the sensor means.

The encoder means and the sensor means are supported by a removable unit 4 independent of the bearing, the said unit being capable of being mounted on the stationary element and having a stationary part 9 supporting the sensor means and a rotating part 13 supporting the encoder means, the rotation of the rotating part being connected to that of the rotating shaft.

31 Claims, 4 Drawing Sheets

DEVICE FOR DETECTING ROTATION OF A VEHICLE STEERING COLUMN

FIELD OF THE INVENTION

The present invention relates to the field of detecting parameters of the rotation of a steering column, for example of a motor vehicle. The rotation parameters which need to be known are, in general, the angular position, the rate of rotation and the direction of rotation.

BACKGROUND OF THE INVENTION

Instrumented rolling bearings which are intended to be mounted on a shaft and which require the steering column to be dismantled when a defective element of a rolling bearing of this kind has to be changed are known from the prior art.

Equipment for detecting the rate of rotation and direction of a steering column shaft is known from document EP-A-0,443,940. The steering column shaft is fitted with a rolling bearing comprising an elongate inner race and an outer race which is also elongate, with rolling bodies arranged between the two races. The inner race is secured to the shaft and the outer race is secured to the steering column casing. An encoder is mounted on the inner race. A sensor is secured to a removable sensor block and supported by the stationary outer race.

This type of equipment has certain drawbacks. The removable sensor block is clipped to the outer race of the rolling bearing of one of the steering column bearings, which means that this race has a shape specially adapted to receive the said block. The encoder ring is fixed to the rotating race of the same rolling bearing, which requires a race shape and dimensions adapted to receive the said encoder. The result of these two requirements is that use is made of non-standard bearings, which leads to an additional cost.

As only the sensor is removable, replacing a defective detection unit (sensor and encoder) therefore involves operations on the steering column mechanism in order to remove the rolling bearing fitted with the encoder.

As the sensor block is mounted on the steering column bearing, the variations of the loads applied to the said bearings may cause variations in the size of the radial air gap between the sensor and the encoder, and this detracts from the detection accuracy. In the event of a failure of the steering column bearing, and of this bearing being changed, the encoder cannot be recovered. The protection of the sensor and of the encoder against external contaminants is not entirely satisfactory. The detection equipment can be fitted only at the end of a steering column in so far as it is fixed to one of the rolling bearings that form the steering column bearing.

Other devices of the prior art propose detection systems in which the encoder is fixed to the rotating shaft of the steering column and in which the sensor is secured to the column casing.

In this case, the air gap between sensor and encoder is generally factory-preset at the time of fitting.

Apart from the problems already mentioned earlier, it is difficult to guarantee a precise air gap that gives a good signal when changing a defective sensor/encoder unit.

BRIEF SUMMARY OF THE INVENTION

The object of the invention is to solve all of these problems by proposing a removable detection device that it is independent of the steering column bearings, the said removable device combining the sensor means and the encoder means.

The detection device according to the invention is intended for measuring parameters of the rotation of a shaft that rotates with respect to a stationary element, there being at least one bearing between the shaft and the stationary element so that the shaft can be mounted to rotate with respect to the stationary element. The detection device comprises an encoder means rotated by the rotating shaft, and a sensor means secured to a stationary element and arranged facing and a small air gap away from the encoder means whose passage during rotation is detected by the sensor means. The encoder means and the sensor means are supported by a removable unit independent of the bearing, the said unit being capable of being mounted on the stationary element and having a stationary part supporting the sensor means and a rotating part supporting the encoder means, the rotation of the rotating part being connected to that of the rotating shaft. Thus, the detection device is not affected by mechanical operations on the steering column and, from the other point of view, any changing of the detection device does not involve operations on the mechanical part of the steering column. The detection device is not mechanically connected to a rolling bearing. The rotating part can be arranged radially on one side of the shaft.

In one embodiment of the invention, the removable unit comprises at least one rolling bearing arranged between the stationary part and the rotating part.

Advantageously, the removable unit is radially adjacent to the rotating shaft and is fixed into an opening made in a tubular casing of the stationary element, the said removable unit comprising a cover closing the said opening. The sensor means and the encoder means are thus perfectly protected.

In one embodiment of the invention, the removable unit comprises an elastic pad arranged between the cover and the stationary part.

In another embodiment, the stationary part comprises an elastic sleeve.

In another embodiment of the invention, the stationary part and the cover are produced as one piece, being connected by an elastic portion which may have a meandering shape. In these three instances, the pad, the sleeve or the elastic portion have the purpose of absorbing any excessive radial preload which may occur directly or indirectly between the rotating part supporting the encoder means and the rotating shaft.

Such a radial preload could be due, for example, to defects in the relative positioning of the rotating shaft and of the rotating part supporting the encoder means or alternatively to radial deformation of the rotating shaft.

This elastic device also makes it possible to reduce or eliminate play between the sets of teeth.

Advantageously, the removable unit comprises a means of taking movement off the rotating shaft.

In one embodiment of the invention, the means of taking movement off the rotating shaft comprises a pinion secured to the rotating shaft, and a crown of teeth arranged on an exterior surface of the rotating part of the removable unit and capable of interacting with the pinion. The pinion may be formed directly on the rotating shaft.

In these embodiments, the pad, the sleeve or the elastic portion make it possible, while avoiding the risks of excessive preload, to make the sets of teeth mesh with no clearance or with a very small clearance, and therefore to obtain a signal that is perfectly representative of the rotation of the rotating shaft.

In another embodiment of the invention, the means of taking movement off the rotating shaft comprises a roller made of an elastic material arranged on an exterior surface of the rotating part of the removable unit and capable of interacting by friction with the rotating shaft.

It may be anticipated for the encoder means to be driven with a step-down ratio other than unity, something which may be highly advantageous in terms of compatibility with the processing system, and as far as the exploiting of the signal provided by the sensor means are concerned. Thus a step-down ratio greater than unity makes it possible to use a magnetic encoder but has a lower number of poles than would be needed if the said encoder were mounted directly on the steering column shaft.

In one embodiment of the invention, the rotating part is of approximately tubular shape, the movement take-off means being arranged approximately in the same radial plane as the rolling bearing.

The encoder means may be arranged on an exterior surface or on a bore of the rotating part.

The invention thus makes available a complete and compact removable detection unit including the sensor and the encoder. The removable unit is not affected by the load applied to the steering column bearings. The rolling bearing used for mounting the encoder so that it can rotate with respect to the sensor experiences no appreciable load likely to cause a variation in the size of the radial air gap between the sensor and the encoder. The signal obtained during running is therefore perfectly stable and reliable.

The removable nature of the detection unit makes the operation of removing and fitting the said unit on the steering column casing particularly easy.

This operation can be carried out without intervention on the mechanical part of the steering column and has no effect on the size of the air gap between sensor and encoder.

The serviceability of the detection unit after the said unit has been fitted (or refitted) on the steering column is therefore completely guaranteed.

As the detection device is independent of the steering column bearings, it can be inserted at any point along the said column.

Furthermore, mechanical operations on the steering column will under no circumstances lead to damage or destruction of the encoder.

Finally, the invention makes it possible to use conventional rolling bearings for the steering column bearings, thus reducing manufacturing costs.

BRIEF DESCRIPTION OF THE SEVERAL VIEWS OF THE DRAWINGS

The invention will be better understood from studying the detailed description of a number of embodiments taken by way of non-limiting examples and illustrated by the appended drawings in which.

DETAILED DESCRIPTION OF THE INVENTION

Figure 1:
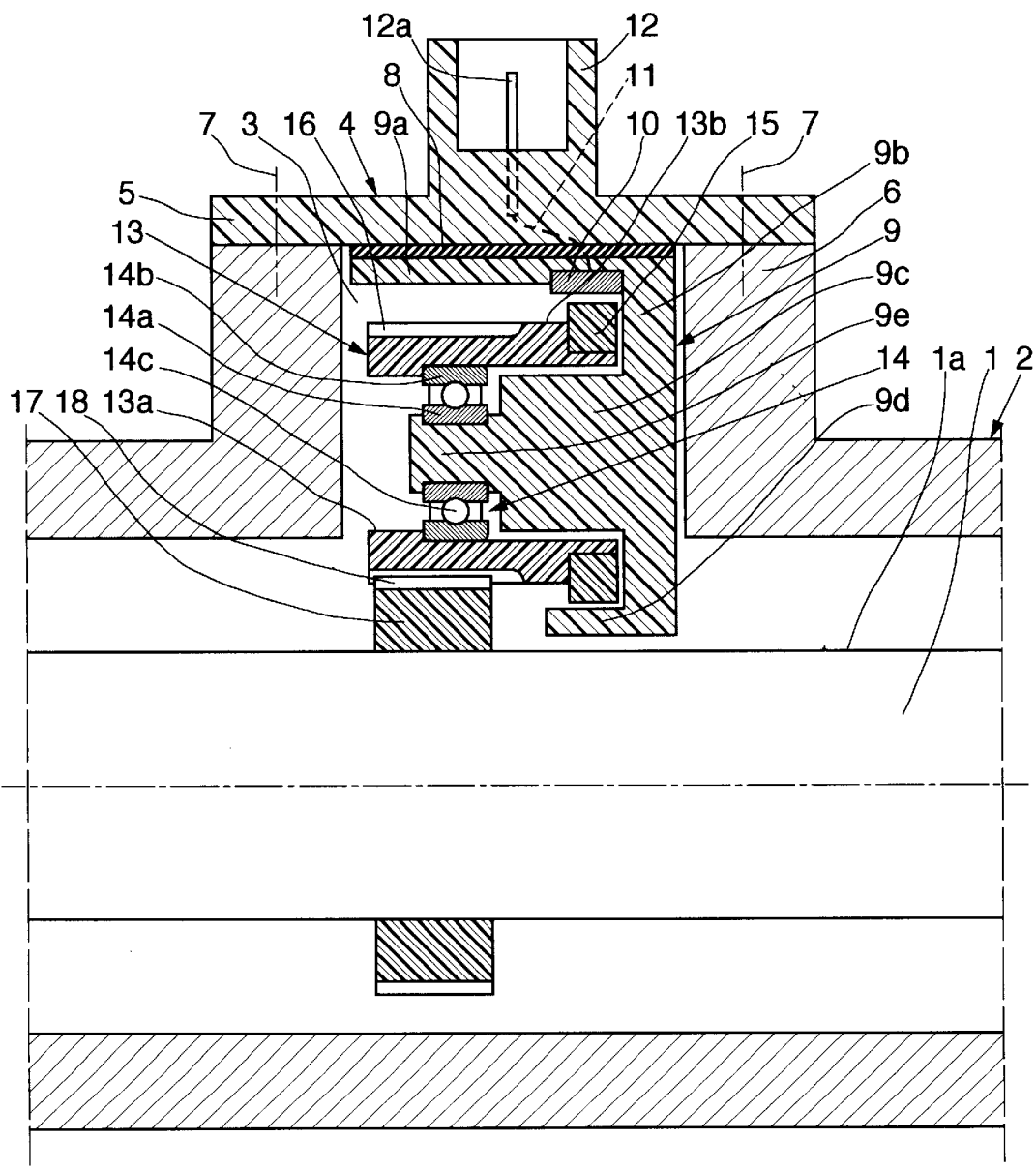
FIG. 1 is a view in transverse section of a steering column equipped with a detection device according to a first embodiment of the invention.

As can be seen in FIG. 1, the steering column comprises a rotating shaft 1 arranged in a tubular casing 2. The rotating shaft 1 is free to rotate with respect to the said tubular casing 2 by means of rolling bearings arranged at its ends, not depicted. The tubular casing 2 comprises a housing 3 formed radially with respect to the said tubular casing 2 and situated axially outside of the region in which the aforementioned rolling bearings are fixed. A removable unit 4 is arranged in the housing 3, and is thus situated to the side of the shaft 1.

The removable unit 4 comprises a cover 5 closing the housing 3 and fixed to the walls 6 of the housing 3, which originate from the tubular casing 2, by means of screws 7. The removable unit 4 also comprises a stationary part 9 made of a synthetic substance and secured to the cover 5 with the interposition of an elastic part 8 between the said cover 5 and the said stationary part 9.

The stationary part 9 has an attachment portion 9a in contact with the elastic pad 8, a radial portion 9b extending from the attachment portion 9a in the direction of the rotating shaft 1, an axial portion 9c extending parallel to the rotating shaft 1, and a cylindrical rim 9d near the rotating shaft 1. The attachment portion 9a supports the sensor 10. By way of an alternative, it would also be possible to provide a number of sensors, and this would make it possible to obtain information relating to the direction of rotation of an encoder with respect to the sensors. The sensor 10 is connected by an electric lead 11 to a connector 12 that has pins 12a allowing it to be connected to an electronic device capable of exploiting the information supplied by the sensor 10.

The axial portion 9c lying entirely inside the housing 3, comprises a smaller-diameter portion 9e arranged at its free end and supporting a rotating part 13 of approximately cylindrical shape by means of a rolling bearing 14 that has a stationary inner race 14a secured to the portion 9e, a rotating outer race 14b secured to the rotating part 13 and a row of rolling bodies 14c, for example balls, arranged between the stationary race 14a and the rotating race 14b.

The rotating part 13 is arranged around the axial portion 9c of the stationary part 9 and has a bore 13a receiving the rolling bearing 14 and an outer surface 13b on which an encoder 15, for example a magnetized multi-polar ring made of plastoferrite, is arranged, it being possible for the sensor 10, to be, for example, a Hall-effect probe. As an alternative, an optical sensor interacting with an appropriate encoder could be provided.

The encoder 15 is arranged radially facing the sensor 10 with a small radial air gap. The encoder 15 is arranged at one axial end of the rotating part 13, close to the radial portion 9b of the stationary part 9 and is surrounded by the attachment portion 9a and the rim 9d. The other axial end of the rotating part 13 receives a crown of teeth 16 formed directly in the material that forms the rotating part 13. This crown of teeth 16 is arranged approximately in the same radial plane as the rolling bearing 14 and is intended to interact by meshing with a pinion 17 fixed to the outer surface 1a of the rotating shaft 1. The pinion 17 is also provided with a crown of teeth 18 of sizes and shape that are adapted to the crown of teeth 16.

Thus, the rotation of the rotating shaft 1 and that of the pinion 17 cause a corresponding rotation of the rotating part 13, the rotation of which is detected by the sensor 10 on account of the presence of the encoder 15.

The elastic pad limits the occurrence of excessive stresses between the crown of teeth 16 and the pinion 17, which stresses might be due, for example, to defects in alignment of the rotating shaft 1 and the rotating part 13 or alternatively to radial deformation of the shaft 1.

The elastic pad also makes it possible in a risk-free way to make the sets of teeth mesh with no or a very small amount of play, and therefore to obtain a signal that is perfectly representative of the rotation of the rotating shaft 1. It is possible to envisage the crown of teeth 16 of the rotating part 13 having a lower number of teeth than the pinion 17. A rotation of the rotating shaft 1 through a given angle then leads to a rotation of the rotating part 13 through a higher angle, and this makes for greater sensitivity in the detection of rotation by the sensor 10. This arrangement also makes it possible to provide a rotating part 13 of a smaller diameter than the pinion 17, which allows a reduction in the amount of space occupied by the removable unit 4.

The housing 3 provided for the removable unit 4, may be arranged along the steering column depending on the bulk of other elements of the vehicle. The steering column rolling bearings arranged at the ends of this column may be removed and changed without any impact on the detection device. Finally, the latter is well protected from external contaminants by being enclosed in the housing 3 which is closed by the cover 5.

Figure 2:
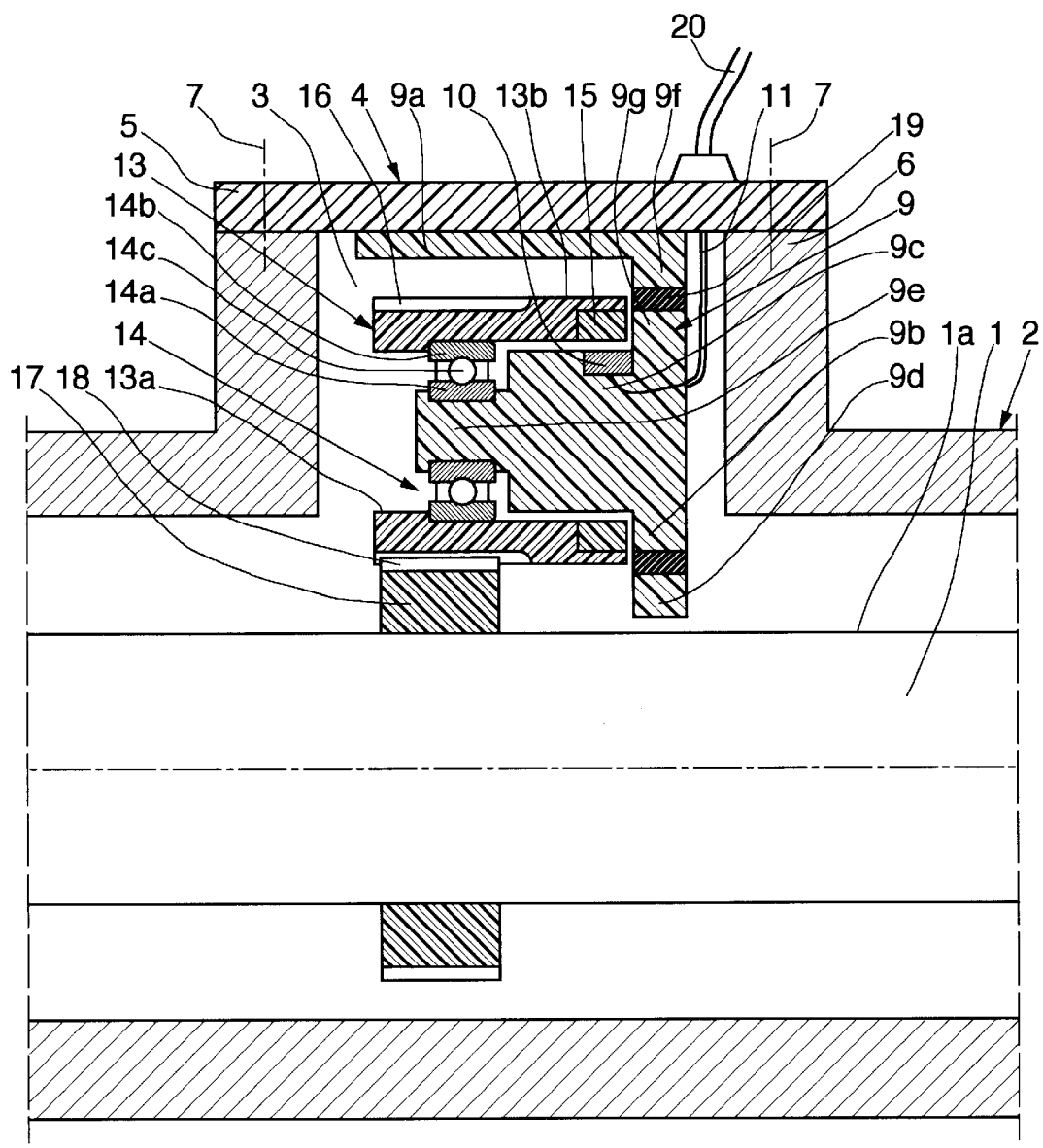
FIG. 2 is a view similar to FIG. 1 of a second embodiment of the invention.

The embodiment illustrated in FIG. 2 is similar to the one in FIG. 1, except that the padding is replaced by a cylindrical elastic sleeve 19 provided between the attachment portion 9a mounted directly on the cover 5 and the axial portion 9c, the radial portion 9b being split into two parts 9f and 9g by the elastic sleeve 19. The sensor 10 in this case is arranged on the outer cylindrical surface of the axial portion 9c and the encoder 15 is arranged on the bore 13a of the rotating part 13. The removable unit 4 has no connector but is connected directly to an electric cable 20. The elastic sleeve 19 has the same function as the elastic pad 8, namely of absorbing any radial loads that may occur between the crown of teeth 16 and the pinion 17.

Figure 3:
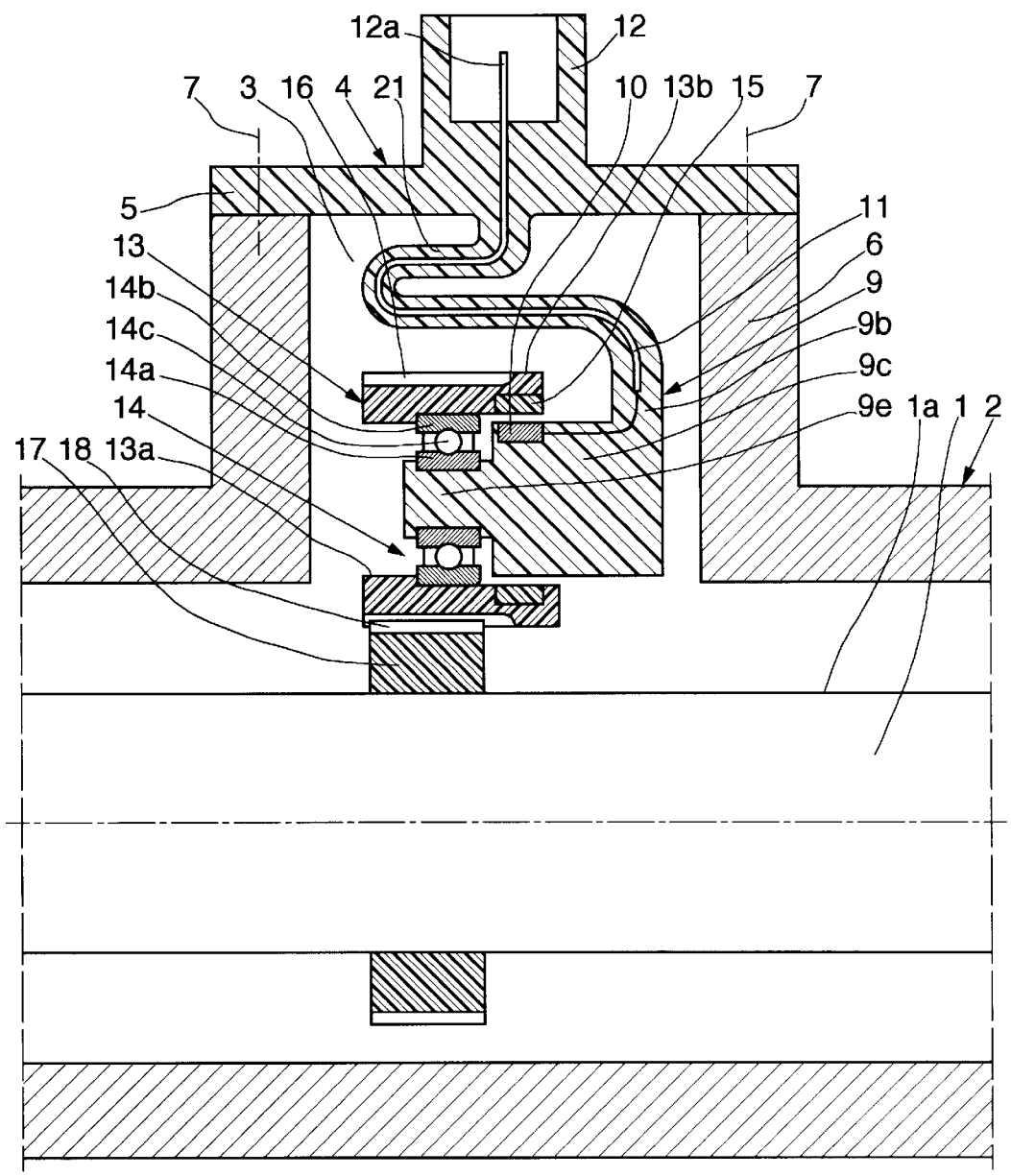
FIG. 3 is a view similar to FIG. 1 of a third embodiment of the invention.
Figure 4:
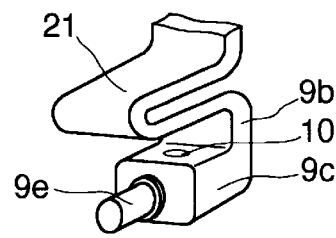
FIG. 4 is a perspective view of the elastic portion connecting the stationary part to the cover.

The embodiment illustrated in FIGS. 3 and 4 is similar to that of FIG. 1, except that the elastic pad is replaced by an elastic portion 21 of meandering shape. The cover 5, the connector 12, the elastic portion 21 and the stationary part 9 form a one-piece unit obtained by moulding, which makes it possible to reduce the total number of parts. The stationary part 9 is reduced to a radial portion 9b of small dimensions, connected to the elastic portion 21, and to the axial portion 9c. The sensor 10 and the encoder 15 are arranged as in FIG. 2.

Advantageously, the pins 12a of the connector extend following the meandering shape of the elastic portion 21 in which they are embedded during the moulding of the one-piece part, the extension of the said pins thus forming part of the conductor element that connects the connector 12 to the sensor 15.

The function of the elastic part is the same as that of the pad 8 or of the sleeve 19.

Figure 5:
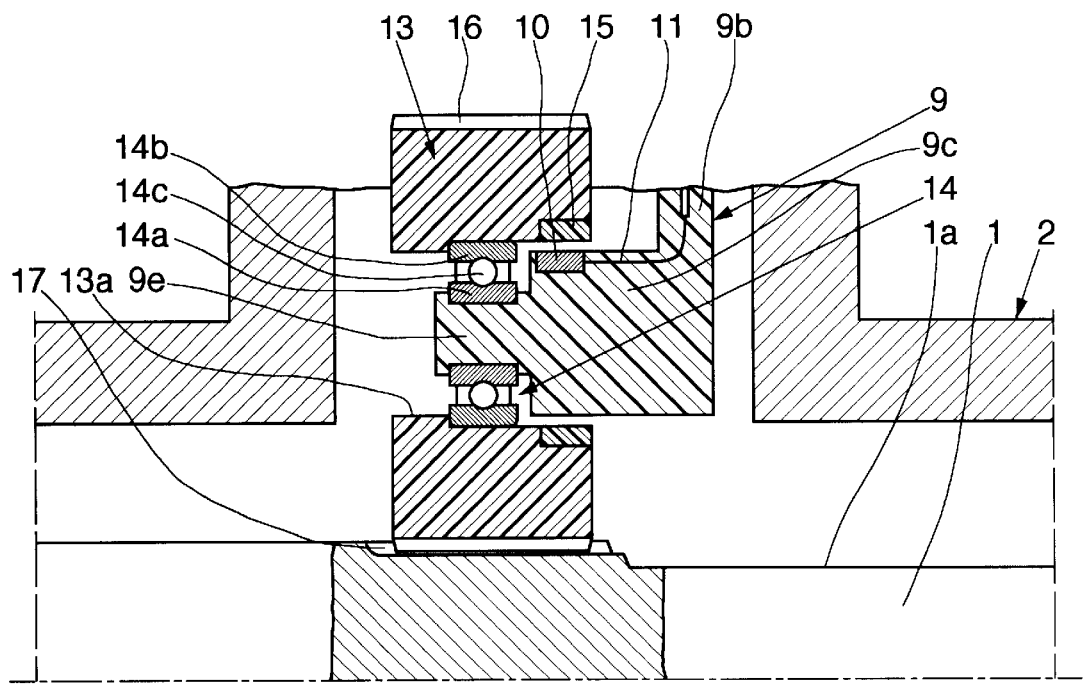
FIG. 5 is a view similar to FIG. 1 of a fourth embodiment of the invention.

In FIG. 5, the pinion with the crown of teeth 17 secured to the rotating shaft 1 is formed directly on the rotating shaft 1, which makes it possible to eliminate one part.

Figure 6:
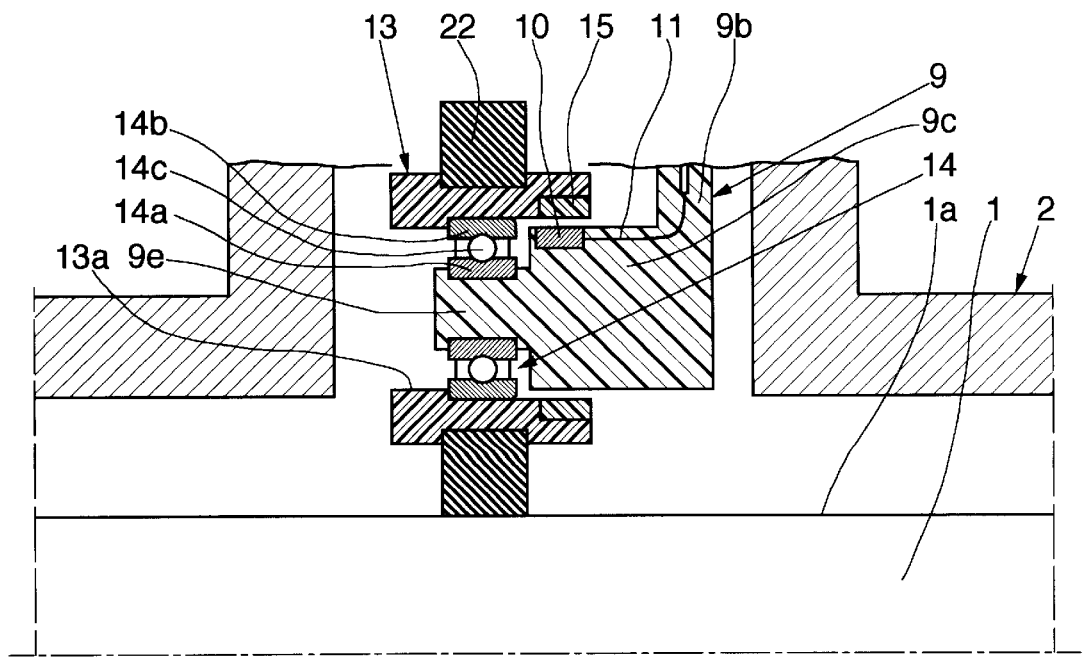
FIG. 6 is a view similar to FIG. 1 of a fifth embodiment of the invention.

In the embodiment illustrated in FIG. 6, the cylindrical exterior surface 13b of the rotating part 13 receives a roller 22 made of an elastic material and coming into contact with the exterior cylindrical surface 1a of the rotating shaft 1. The rotating shaft 1 drives the roller 22 by friction. Thus the presence of teeth or of a pinion on the rotating shaft 1 is avoided.

Other alternative forms of the device could be envisaged without departing from the scope of the invention.

Thus, it would be possible to use a cover/stationary part assembly that did not comprise any elastic element connecting these two parts together.

One could also envisage the use of two rolling bearings instead of one in order to give the system greater rigidity and further improve, if necessary, the stability of the size of the air gap between the sensor and the encoder.

The invention has yielded a complete removable detection unit which includes the sensor and the encoder and which is not affected by the loads applied to the steering column bearings, and this increases the accuracy of the detection by reducing the variation in the size of the air gap between the sensor and the encoder. The complete detection unit can be inserted at any point on the steering column, independently of the rolling bearings arranged at the ends of this column. A steering column bearing can be replaced without any impact on the detection unit which can be kept intact. In the same way, the detection unit can be replaced without intervention and without impact on the steering column bearing or bearings.

What is claimed is:

1. A device for detecting parameters of a rotating shaft which rotates with respect to a non-rotating element, said device comprising:

an encoder;

a sensor, said sensor facing the encoder across a gap such that encoder passage during rotation of the encoder is detectable by said sensor;

a removable unit which supports the encoder and the sensor, which removable unit is mountable on the non-rotating element, said removable unit having a non-rotating part which supports the sensor and a rotating part which supports the encoder, with rotation of the rotating part and the encoder being by way of rotative communication with the rotating shaft.

2. The device according to claim 1, wherein the rotating part of the removable unit is arranged radially on one side of the shaft.

3. The device according to claim 1, wherein the removable unit comprises at least one rolling bearing arranged between the non-rotating part and the rotating part.

4. The device according to claim 2, wherein the removable unit comprises at least one rolling bearing arranged between the non-rotating part and the rotating part.

5. The device according to claim 1, wherein the removable unit is radially adjacent to the rotating shaft and is fixed into an opening made in a tubular casing of the non-rotating element, the removable unit further comprising a cover closing the opening.

6. The device according to claim 2, wherein the removable unit is radially adjacent to the rotating shaft and is fixed into an opening made in a tubular casing of the non-rotating element, the removable unit further comprising a cover closing the opening.

7. The device according to claim 3, wherein the removable unit is radially adjacent to the rotating shaft and is fixed into an opening made in a tubular casing of the non-rotating element, the removable unit further comprising a cover closing the opening.

8. The device according to claim 4, wherein the removable unit is radially adjacent to the rotating shaft and is fixed into an opening made in a tubular casing of the non-rotating element, the removable unit further comprising a cover closing the opening.

9. The device according to claim 5, wherein the removable unit further comprises an elastic pad arranged between the cover and the non-rotating part.

10. The device according to claim 5, wherein the non-rotating part comprises an elastic sleeve.

11. The device according to claim 5, wherein the non-rotating part and the cover comprise a single piece.

12. The device according to claim 5, wherein the non-rotating part and the cover are connected by an elastic part.

13. The device according to claim 12, wherein the elastic part has a meandering shape.

14. The device according to claim 1, wherein the removable unit comprises a means of taking movement off the rotating shaft.

15. The device according to claim 9, wherein the removable unit comprises a means of taking movement off the rotating shaft.

16. The device according to claim 10, wherein the removable unit comprises a means of taking movement off the rotating shaft.

17. The device according to claim 12, wherein the removable unit comprises a means of taking movement off the rotating shaft.

18. The device according to claim 14, wherein the means of taking movement off the rotating shaft comprises a pinion secured to the rotating shaft, and a crown of teeth arranged on an exterior surface of the rotating part of the removable unit which operably engages the pinion.

19. The device according to claim 18, wherein the pinion is formed directly on the rotating shaft.

20. The device according to claim 14, wherein the means of taking movement off the rotating shaft comprises a roller made of an elastic material positioned on an exterior surface of the rotating part of the removable unit, which roller interacts with the rotating shaft via friction.

21. The device according to claim 14, wherein the rotating part is of approximately tubular shape, and the means of taking movement is arranged approximately in a same radial plane as the rotating bearing.

22. The device according to claim 20, wherein the rotating part is of approximately tubular shape, and the means of taking movement is arranged approximately in a same radial plane as the rotating bearing.

23. A removable unit for detecting parameters of rotation, comprising:

a non-rotating part mountable on a non-rotating element;

a rotating part designed for rotative communication with respect to a rotating shaft, with the shaft being associated with at least one shaft bearing operably positioned between the shaft and the non-rotating element so that the shaft can be mounted to rotate with respect to the non-rotating element;

an encoder secured to said rotating part; and a sensor for sensing said encoder, said sensor being secured to said non-rotating part and arranged facing said encoder so as to define a small air gap between said encoder and said sensor, and wherein said removable unit is independent of the shaft bearing when in operating position.

24. The removable unit according to claim 23, wherein said removable unit further comprises an elastic pad to provide a degree of elasticity to the non-rotating part with respect to the non-rotating element.

25. The removable unit according to claim 23, wherein the non-rotating part comprises an elastic sleeve to provide a degree of elasticity with respect to the non-rotating element.

26. The removable unit according to claim 23, wherein said removable unit comprises a cover for positioning over an opening in the non-rotating element.

27. The removable unit according to claim 26, wherein said non-rotating part and said cover are connected by an elastic part.

28. The removable unit according to claim 26, wherein said cover and the non-rotating part are formed as a spring shaped single piece.

29. The removable unit according to claim 23, wherein the removable unit comprises means of taking movement off the rotating shaft.

30. The removable unit according to claim 29, wherein the means of taking movement off the rotating shaft comprises a crown of teeth arranged on an exterior surface of said rotating part of said removable unit which is designed to operably engage a pinion secured to the rotating shaft.

31. The removable unit according to claim 29, wherein the means of taking movement off the rotating shaft comprises a roller made of an elastic material positioned for rotative frictional communication with the shaft.

* * * * *